United States Patent [19]

Pietraszkiewicz et al.

[11] Patent Number: 5,584,651
[45] Date of Patent: Dec. 17, 1996

[54] COOLED SHROUD

[75] Inventors: Edward F. Pietraszkiewicz, Maineville; David A. Frey; Robert I. Ackerman, both of West Chester; Carl D. Wright, Clarksville, all of Ohio

[73] Assignee: General Electric Company, Cincinnati, Ohio

[21] Appl. No.: 331,401

[22] Filed: Oct. 31, 1994

[51] Int. Cl.$^6$ ............................ F01D 11/08; F01D 25/12
[52] U.S. Cl. .......................................... 415/115; 415/173.1
[58] Field of Search .................... 415/115, 173.1, 415/173.3

[56]  References Cited

U.S. PATENT DOCUMENTS

| | | | |
|---|---|---|---|
| 3,527,544 | 9/1970 | Allen | 416/191 |
| 3,606,574 | 9/1971 | Brands et al. | 416/191 |
| 3,800,864 | 4/1974 | Hauser et al. | 415/115 |
| 3,836,279 | 9/1974 | Lee | 415/173.1 |
| 3,990,807 | 11/1976 | Sifford . | |
| 4,013,376 | 3/1977 | Bisson et al. | 416/191 |
| 4,222,706 | 9/1980 | Ayache et al. | 415/116 |
| 4,337,016 | 6/1982 | Chaplin | 415/173.1 |
| 4,353,679 | 10/1982 | Hauser | 415/115 X |
| 4,551,064 | 11/1985 | Pask | 415/116 |
| 4,573,865 | 3/1986 | Hsia et al. | 415/173.1 |
| 4,573,866 | 3/1986 | Sandy, Jr. et al. | 415/116 |
| 5,169,287 | 12/1992 | Proctor et al. | 415/115 |
| 5,243,759 | 9/1993 | Brown et al. . | |

FOREIGN PATENT DOCUMENTS

| | | |
|---|---|---|
| 0516322A | 12/1992 | European Pat. Off. . |
| 9412766 | 6/1994 | European Pat. Off. . |
| 1524956 | 9/1978 | United Kingdom . |
| 2125111 | 2/1984 | United Kingdom ........... 415/115 |
| 2168110 | 6/1986 | United Kingdom . |

*Primary Examiner*—Edward K. Look
*Assistant Examiner*—Michael S. Lee
*Attorney, Agent, or Firm*—Andrew C. Hess; Patrick R. Scanlon

[57] ABSTRACT

A shroud includes a panel having leading and trailing edges and inner and outer surfaces extending therebetween. A cooling passage extends through the panel from adjacent the leading edge to an intermediate location and is generally parallel to the inner and outer surfaces. The cooling passage has an inlet for receiving cooling air from adjacent the panel outer surface, a plurality of spaced apart turbulators disposed adjacent to the panel inner surface, and an outlet disposed at the leading edge for discharging the cooling air from the passage.

10 Claims, 3 Drawing Sheets

COOLED SHROUD

The present invention relates generally to gas turbine engines, and, more specifically, to shrouds and flowpath components therein requiring cooling.

BACKGROUND OF THE INVENTION

A gas turbine engine includes a combustor which generates hot combustion gases which flow downstream therefrom and through a turbine nozzle which suitably directs the flow into a row of turbine blades which extract energy therefrom. The turbine nozzle includes a plurality of circumferentially spaced apart stator vanes mounted radially between radially inner and outer bands which confine the combustion gas flow. Disposed radially outwardly of the turbine blades are a plurality of circumferentially adjacent shrouds which also confine the combustion gas flow.

Both the nozzle bands and the turbine shrouds are typically cooled by channeling thereto cooling air which is bled from the compressor of the engine.

Turbine shrouds typically have forward and aft hooks extending radially outwardly therefrom for conventionally mounting the shrouds to stationary components of the engine. In one exemplary design, the leading edge of the shroud extends axially upstream from the leading edge of the turbine blades and effects a relatively large overhang as measured between the shroud leading edge and the forward hook from which it is supported. The turbine shrouds are typically cooled by providing bleed air from the compressor into the shroud between the forward and aft hooks thereof through a suitable impingement baffle which directs the cooling air in impingement against the radially outer surface of the shroud. The shroud typically includes a plurality of rows of inclined film cooling holes which extend through the shrouds, with inlets disposed between forward and aft hooks and outlets at the leading edge overhang. As the overhang lengths increases, the lengths of the film cooling holes also increases which decreases the effectiveness of cooling the overhang since the cooling air increase in temperature at it travels through the relatively long, thin cooling holes. Improved cooling configurations are desired for turbine shrouds having particularly large overhangs.

SUMMARY OF THE INVENTION

A shroud includes a panel having leading and trailing edges and inner and outer surfaces extending therebetween. A cooling passage extends through the panel from adjacent the leading edge to an intermediate location and is generally parallel to the inner and outer surfaces. The cooling passage has an inlet for receiving cooling air from adjacent the panel outer surface, a plurality of spaced apart turbulators disposed adjacent to the panel inner surface, and an outlet disposed at the leading edge for discharging the cooling air from the passage.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
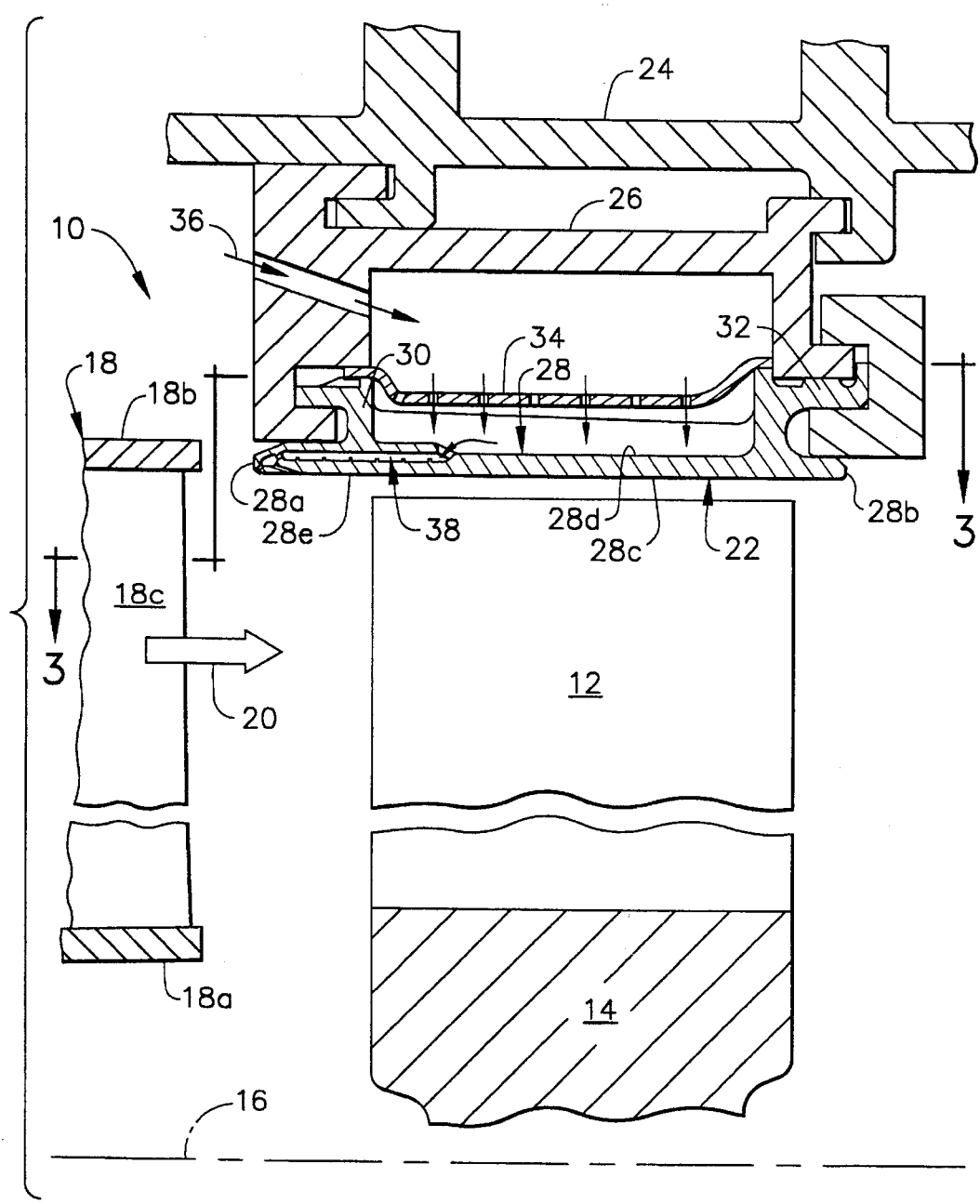
FIG. 1 is a schematic, elevational sectional view of a portion of a turbine in a gas turbine engine having a shroud in accordance with one embodiment of the present invention.

Illustrated schematically in FIG. 1 is an exemplary high pressure turbine 10 of an aircraft gas turbine engine. The turbine 10 includes a plurality of circumferentially spaced apart, radially extending turbine blades 12 fixedly joined to an annular rotor disk 14 about an axial centerline axis 16. Disposed upstream from the turbine blades 12 is a conventional high pressure turbine nozzle 18 including radially inner and outer bands 18a,b and a plurality of circumferentially spaced apart stator vanes 18c extending radially therebetween. The turbine nozzle receives hot combustion gas 20 from a conventional combustor (not shown), with the combustion gas 20 being directed downstream between the blades 12 which extract energy therefrom.

To confine the combustion gas 20 from flowing freely over the radially outer tips of the blades 12, a plurality of circumferentially adjoining shrouds 22 are conventionally supported from an outer casing 24 by hangers 26.

Each of the shrouds 22 is an arcuate segment which collectively provide a 360° flowpath boundary around the blade tips. In accordance with one embodiment of the present invention as illustrated in FIG. 1, each shroud 22 includes an arcuate plate or panel 28 having a leading edge 28a for first receiving the combustion gas 20, and a trailing edge 28b at an opposite end thereof from which the combustion gas 20 flows downstream therefrom. Each of the panels 28 further includes a radially inner surface 28c extending axially between the leading and trailing edges 28a,b which defines the flowpath boundary of the combustion gas 20. The panel 28 also includes a radially outer surface 28d extending between the leading and trailing edges 28a,b which is spaced radially outwardly from the inner surface 28c for providing a suitably thick panel 28.

Each of the shrouds 22 includes a conventional forward hook 30 extending radially outwardly from the panel 28 at a suitable distance from the leading edge 28a for defining a cantilevered overhang 28e. A conventional aft hook 32 extends radially outwardly from the panel 28 adjacent to the trailing edge 28b. The forward and aft hooks 30, 32 are conventionally configured as L-shaped hooks which are complementary to the hangar 26 for supporting the shroud 22 radially above the turbine blade 12.

Fixedly joined to the hangers 26 is a conventional perforated impingement baffle 34 which extends between the forward and aft hooks 30, 32 and above the panel outer surface 28d, and is conventionally provided with cooling air 36 which is bled from a compressor (not shown) of the gas turbine engine. The cooling air 36 is directed in impingement against the panel outer surface 28d for effecting impingement cooling thereof for the region of the panel 28 between the forward and aft hooks 30, 32.

Since the panel 28 includes a relatively large overhang 28e extending upstream from both the forward hook 30 and the turbine blades 22, effective cooling thereof is required in order to obtain useful life thereof with minimal expenditure of the cooling air 36. In accordance with one embodiment of the present invention, the panel 28 includes a cooling manifold or passage 38 extending therein from an intermediate location of the panel 28 between the leading and trailing edges 28a,b, and in particular between the forward and aft hooks 30, 32, to the leading edge 28a which includes the overhang 28e to be cooled.

Figure 2:
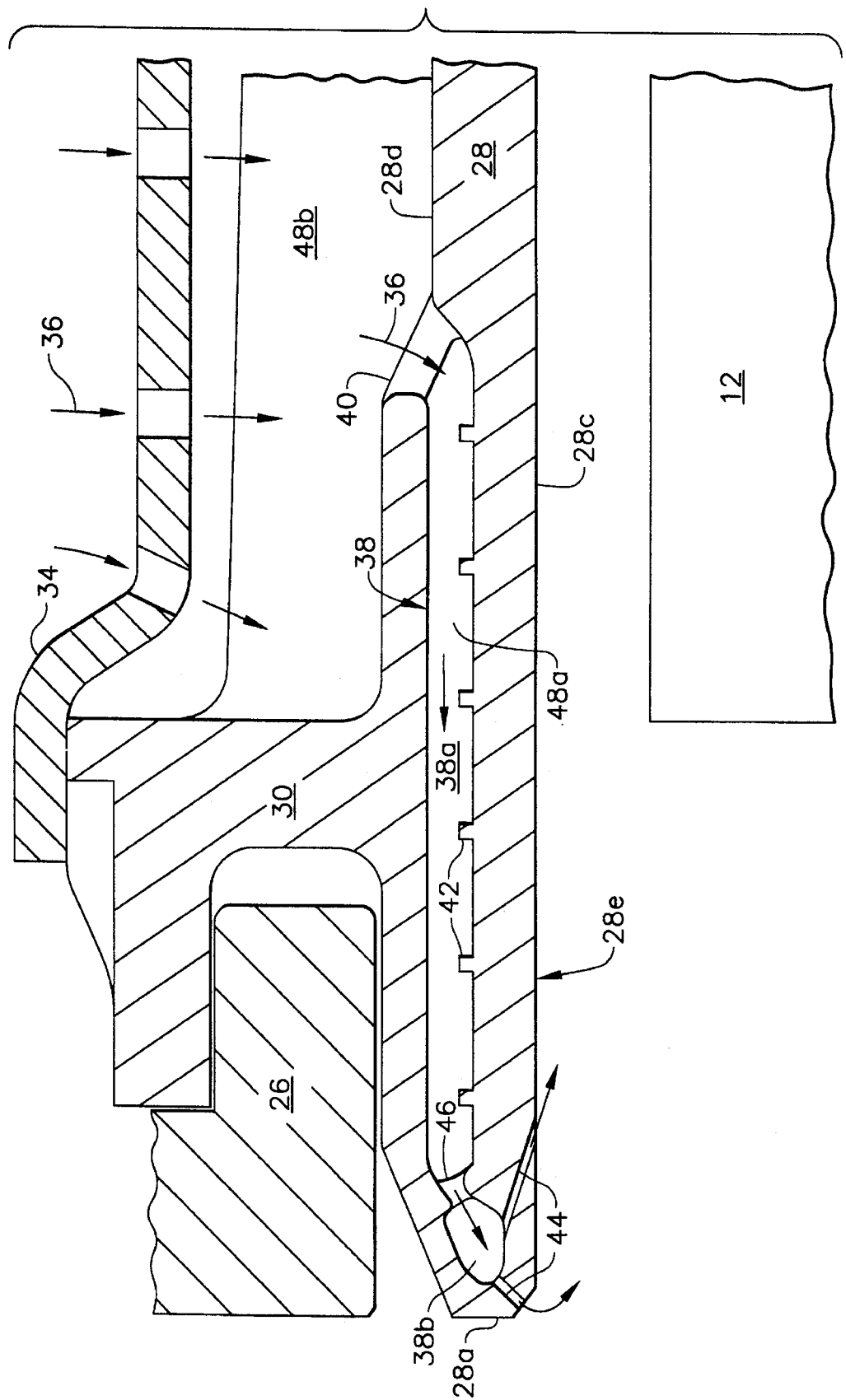
FIG. 2 is an enlarged partly sectional view of the leading edge portion of the shroud illustrated in FIG. 1.

As shown in more particularity in FIG. 2, the cooling passage 38 is disposed generally parallel to the panel inner and outer surfaces 28c,d and includes a circumferentially elongate inlet 40 disposed at the intermediate location between the forward and aft hooks 30, 32 for receiving the cooling air 36 from adjacent the panel outer surface 28, with most of the cooling air 36 being used firstly for impingement cooling the panel outer surface 28d prior to entering the cooling passage inlet 40. Disposed inside the cooling passage 38 are a plurality of axially spaced apart elongate turbulators 42 which are disposed adjacent to the panel inner surface 28c and are formed integrally with the radially inner side of the cooling passage 38. The cooling passage 38 includes an outlet 44 disposed at the leading edge 28a for discharging the cooling air 36 from the cooling passage 38 and along the panel inner surface 28c. The cooling passage outlet 44 preferably comprises one or more rows of film cooling holes, with two rows being illustrated for example.

Figure 3:
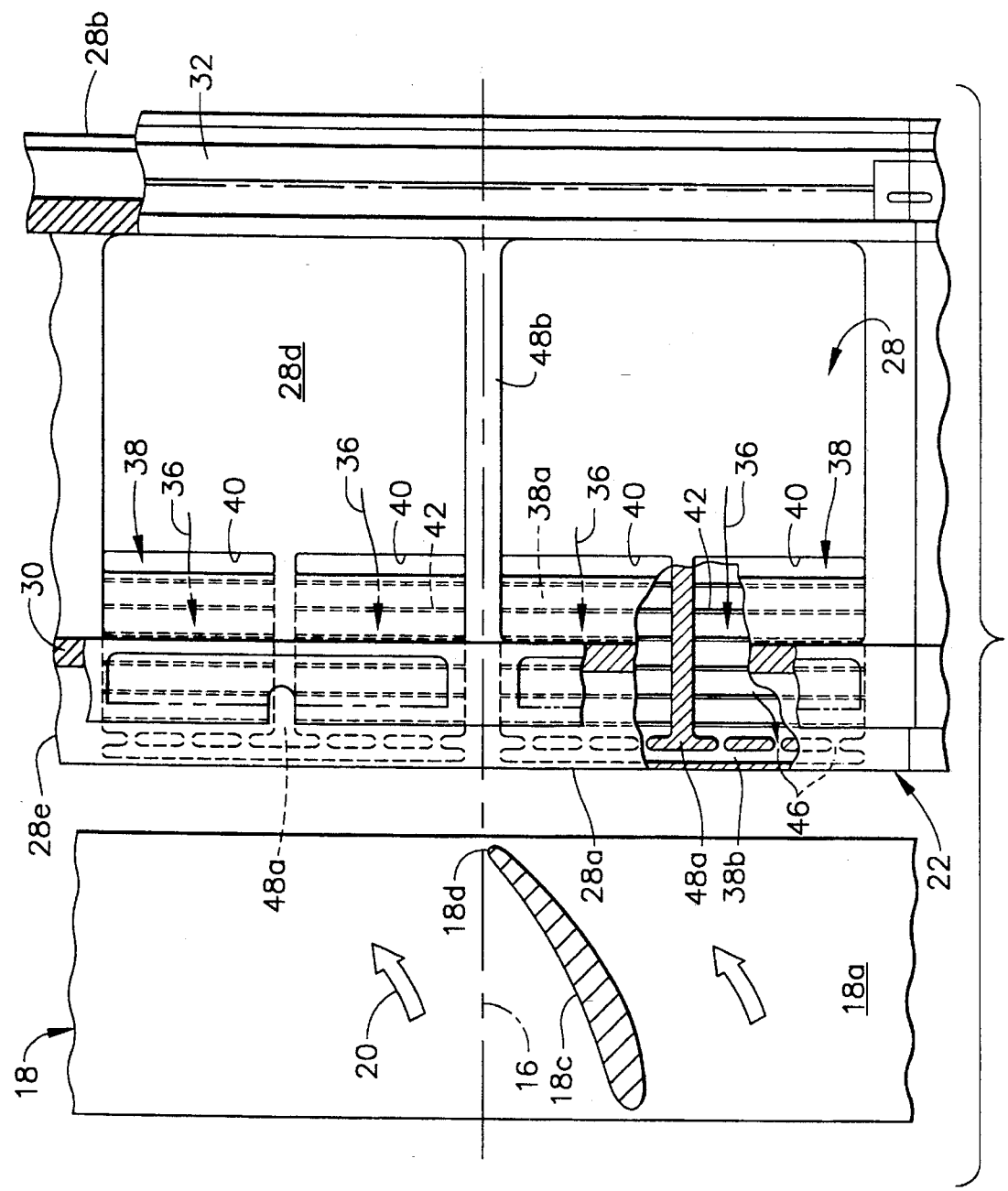
FIG. 3 is a top view of the turbine shroud illustrated in FIG. 1 and taken generally along line 3—3.

The turbulators 42 as shown in FIGS. 2 and 3 are conventional, circumferentially elongate ribs having a suitable height and pitch or spacing for enhancing the heat transfer between the cooling air 36 within the passage 38 and the panel 28 itself. The turbulators 42 may take any conventional form as desired. As illustrated in FIG. 2, the cooling passage 38 provides enhanced cooling of the leading edge region of the panel 28, and particularly at the overhang 28e, since it is a relatively large passage within the panel itself, and therefore decreases the thickness of the panel portion above and below the passage 38 itself as compared to the thickness of the panel 28 downstream therefrom. Accordingly, less mass of the panel 28 in the overhang 28e region is subject to being heated which decreases the initial need for the cooling thereof. Furthermore, instead of having relatively long film cooling holes extending through the relatively long overhang 28e, relatively short film cooling holes 44 can be provided solely adjacent to the panel leading edge 28a for effecting cooling therefrom.

As shown in FIGS. 2 and 3, a plurality of laterally or circumferentially spaced apart impingement holes 46 are disposed between the outlets 44 and the turbulators 42 in the cooling passage 38 for dividing the cooling passage 38 into an inlet plenum 38a extending aft to the passage inlet 40, and an outlet plenum 38b extending forward to the leading edge 28a. The impingement holes 46 are spaced rearwardly from the leading edge 28a to impinge the cooling air against the inside surface of the leading edge 28a for impingement cooling thereof prior to being discharged from the passage outlet 44. In this way, the initial cooling air 36 channeled to the shrouds 22 is used firstly for impingement cooling of the panel outer surface 28d and then flows through the passage inlet 40 for convection cooling of the panel 28 through the cooling passage 38, with the turbulators 42 providing enhanced heat transfer. The cooling air 36 is ejected through the impingement holes 46 for providing impingement cooling of the panel leading edge 28a and then flows through the plurality of film cooling outlet holes 44 for cooling the panel 28 adjacent thereto and then establishing a film of cooling air which flows aft from the leading edge 28 along the panel inner surface 28c for providing film cooling.

As shown in FIG. 2, the cooling passage 38 extends upstream from its inlet 40 between the forward and aft hooks 30, 32 to channel the cooling air 36 to the panel overhang 28e for providing enhanced cooling therefrom, with the cooling air 36 being discharged from the film cooling outlets 44 in an aft, downstream direction. As shown in FIG. 3, the cooling passage 38 preferably extends almost the entire circumferential or lateral extend of each of the shrouds 22 for providing effective cooling of the entire circumferential extent of the overhang 28e.

More specifically, each of the panels 28 preferably includes a plurality of substantially identical cooling passages 38, with adjacent ones of which having an elongate first rib 48a or second rib 48b extending axially between the impingement holes 46 and the passage inlets 40 to effect a flow barrier between adjacent inlet plenums 38a. In the exemplary embodiment illustrated in FIG. 3, the second rib 48b is a structural stiffening rib disposed along the center of the panel 28 parallel to the centerline axis 16 and extends from the leading edge 28a to adjacent the trailing edge 28b for stiffening the entire panel 28 in an axial direction. A pair of the first ribs 48a are disposed on respective sides of the second rib 48b for effective or creating four of the cooling passages 38 disposed in parallel flow for separately channeling the cooling air 36 from respective ones of the four inlets 40 thereof to respective film cooling outlet holes 44 thereof. Each of the several ribs 48a,b provide both structural stiffening of the panel 28 as well as separating the adjacent cooling passages 38. The aft hook 32, as well as the forward hook 30, which extends radially outwardly above the cooling passages 38, also provide stiffening of the panel 28 in the circumferential direction.

As shown in FIG. 3, the first ribs 48a end or terminate at the impingement holes 46, and adjacent outlet plenums 38b are disposed together in flow communication. However, the center second rib 48b extends completely to the leading edge 28a to provide a flow barrier between adjacent outlet plenums 38b for effecting independent channeling of the cooling air 36 through adjacent cooling passages 38. Since the flow of the cooling air 36 through the several cooling passages 38 is controlled by the differential pressure between the inlet 40 and the outlets 44, circumferential variation in the pressure at either the inlet 40 or the outlet 44 will promote circumferential crossflow through the cooling passages 38 but for the ribs 48a,b located therein for providing effective barriers to such crossflow.

The turbine nozzle 18 is shown in FIG. 3 adjacent to the leading edge 28a of one of the shrouds 22. Since the turbine nozzle 18 includes a plurality of circumferentially spaced apart stator vanes 18c, the pressure of the combustion gas 20 flowing therefrom varies in the circumferential direction. Accordingly, it is desirable to locate the trailing edge 18d of each stator vane 18c in circumferential alignment with the center, second rib 48b of the corresponding shroud 22. In this exemplary embodiment, there is a one-to-one correspondence between the number of stator vanes 18c and the number of shrouds 22, with each vane 18c being preferentially aligned with the center of each panel 28. Since the center rib 48b completely blocks the adjacent two cooling passages 38, circumferential crossflow through the adjacent outlet plenums 38b is prevented. In this way, the density and flowrate through the film cooling outlet holes 44 for the separate cooling passages 38 on both sides of the center rib 48b may be independently varied for better matching the circumferentially varying pressure distribution of the combustion gas 20 from the turbine nozzle 18 for providing more effective cooling of the panel overhang region 28e.

Accordingly, the improved shrouds 22 are effective for providing enhanced cooling of relatively long panel overhangs 28e near the leading edges 28a thereof. Furthermore, the invention may be practiced for overhangs at the trailing edges 28b as well. The invention may also be practiced wherever beneficial including analogous overhangs in the nozzle bands 18a,b for example.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A shroud for providing a flowpath boundary for hot combustion gas in a turbine of a gas turbine engine comprising:

a panel having a leading edge for first receiving said combustion gas, a trailing edge at an opposite end thereof from which said combustion gas flows downstream therefrom, an inner surface extending between said leading edge and said trailing edge defining said flowpath boundary, and an outer surface extending between said leading edge and said trailing edge and spaced from said panel inner surface;

said panel further including a cooling passage extending from an intermediate location between said leading and trailing edges toward one of said leading and trailing edges;

said cooling passage having an inlet disposed at said intermediate location for receiving cooling air from adjacent said panel outer surface, a plurality of spaced apart turbulators disposed adjacent to said panel inner surface for enhancing heat transfer, and an outlet disposed at said one edge for discharging said cooling air from said cooling passage and along said panel inner surface at least a portion of said passage between said inlet and said outlet being generally parallel to said panel inner surface.

2. A shroud according to claim 1 further comprising a plurality of spaced apart impingement holes disposed between said passage outlet and said turbulators in said cooling passage for dividing said cooling passage into an inlet plenum extending aft to said inlet and an outlet plenum extending forward to said one edge to impinge said cooling air against an inside surface of said one edge for impingement cooling thereof prior to discharge from said passage outlet.

3. A shroud according to claim 2 wherein said cooling passage extends to said leading edge, and said cooling passage outlet comprises a plurality of film cooling holes extending from said outlet plenum to said leading edge for discharging said cooling air as a film along said panel inner surface.

4. A shroud according to claim 3 further comprising a plurality of said cooling passages, adjacent ones having an elongate rib extending between said impingement holes and said passage inlets to effect a flow barrier between adjacent inlet plenums.

5. A shroud according to claim 4 wherein said rib ends at said impingement holes, and adjacent outlet plenums are disposed together in flow communication.

6. A shroud according to claim 4 wherein said rib extends to said leading edge to provide a flow barrier between adjacent outlet plenums for effecting independent channeling of said cooling air through adjacent cooling passages.

7. A shroud according to claim 4 further comprising a plurality of said ribs including:

a first rib ending at said impingement holes, with adjacent outlet plenums being disposed together in flow communication; and a second rib extending to said leading edge to provide a flow barrier between adjacent outlet plenums for effecting independent channeling of said cooling air through adjacent cooling passages.

8. A shroud according to claim 7 wherein:

said second rib is disposed along a center of said panel and extends from said leading edge to adjacent said trailing edge; and a pair of said first ribs are disposed on respective sides of said second rib for effecting four of said cooling passages disposed in parallel flow for separately channeling said cooling air from respective inlets thereof to respective film cooling outlet holes thereof.

9. A shroud according to claim 8 further comprising:

a forward hook extending outwardly from said panel above said cooling passages;

an aft hook extending outwardly from said panel adjacent to said trailing edge;

said forward and aft hooks being configured for supporting said shroud above a turbine blade; and wherein said cooling passage inlets are disposed between said forward and aft hooks for receiving said cooling air.

10. A shroud according to claim 9 in combination with a turbine nozzle disposed upstream therefrom, said nozzle including a stator vane having a trailing edge aligned with said center second rib.

* * * * *